US011727194B2

(12) United States Patent
Villaron (10) Patent No.: US 11,727,194 B2
(45) Date of Patent: Aug. 15, 2023

(54) ENCODED ASSOCIATIONS WITH EXTERNAL CONTENT ITEMS

(71) Applicant: Microsoft Technology Licensing, LLC., Redmond, WA (US)

(72) Inventor: Shawn Alan Villaron, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 14/623,429

(22) Filed: Feb. 16, 2015

(65) Prior Publication Data
US 2015/0234795 A1 Aug. 20, 2015

Related U.S. Application Data

(60) Provisional application No. 61/940,663, filed on Feb. 17, 2014.

(51) Int. Cl.
*G06F 40/134* (2020.01)
*G06F 16/33* (2019.01)
(Continued)

(52) U.S. Cl.
CPC ......... *G06F 40/134* (2020.01); *G06F 3/0484* (2013.01); *G06F 16/3331* (2019.01); *G06F 40/166* (2020.01)

(58) Field of Classification Search
None
See application file for complete search history.

(56) References Cited

U.S. PATENT DOCUMENTS 6,233,591 B1 * 5/2001 Sherman ............... G06F 3/0481
707/E17.116
6,585,777 B1 * 7/2003 Ramaley ........... G06F 17/30076
707/999.1
(Continued)

FOREIGN PATENT DOCUMENTS

CN 1808439 A 7/2006
CN 1987912 A 6/2007
(Continued)

OTHER PUBLICATIONS

"Second Written Opinion Issued in PCT Application No. PCT/US2015/016058", dated Jan. 26, 2016, 5 Pages.
(Continued)

*Primary Examiner* — Howard Cortes
(74) *Attorney, Agent, or Firm* — NovoTechIP International PLLC (57) ABSTRACT

An association of one or more renditions of external content items with a document is provided. A user may create a document, and may select to insert a piece of external content into the document. When the user selects to insert the external content into the document, a URL of the location where the content resides may be associated with the document. Other asset data may also be associated with the content item, such as public copyright license information and other relevant information, and may encoded into the document. When the document is shared, the asset data may also be provided. Accordingly, the consuming application software may be enabled to follow the URL and utilize other asset data to retrieve the content item.

21 Claims, 10 Drawing Sheets

(51) Int. Cl.
  *G06F 40/166* (2020.01)
  *G06F 3/0484* (2022.01)

(56) References Cited

U.S. PATENT DOCUMENTS

| | | | |
|---|---|---|---|
| 6,859,791 B1 | 2/2005 | Spagna et al. | |
| 9,081,465 B1* | 7/2015 | Stone | G06F 3/048 |
| 9,832,532 B1* | 11/2017 | Agabob | H04N 21/47815 |
| 2002/0131760 A1* | 9/2002 | Hirai | G11B 27/034 |
| | | | 386/282 |
| 2002/0162120 A1* | 10/2002 | Mitchell | H04N 7/165 |
| | | | 725/135 |
| 2002/0181016 A1 | 12/2002 | Al-Kazily et al. | |
| 2004/0172365 A1* | 9/2004 | Murakami | G06Q 30/04 |
| | | | 705/52 |
| 2005/0149935 A1 | 7/2005 | Benedetti | |
| 2006/0259854 A1 | 11/2006 | Walker et al. | |
| 2007/0100846 A1* | 5/2007 | King | G06F 17/30067 |
| 2008/0214163 A1 | 9/2008 | Onyon et al. | |
| 2008/0235565 A1* | 9/2008 | Ackerman | G06F 17/2235 |
| | | | 715/205 |
| 2008/0256482 A1* | 10/2008 | Lee | G06F 21/10 |
| | | | 715/781 |
| 2009/0271319 A1* | 10/2009 | Bromley | G11B 20/00086 |
| | | | 705/59 |
| 2009/0288099 A1* | 11/2009 | Rybak | G06F 17/30864 |
| | | | 719/313 |
| 2011/0022582 A1* | 1/2011 | Unnikrishnan | G06F 17/30336 |
| | | | 707/715 |
| 2011/0276538 A1* | 11/2011 | Knapp | G06F 17/302 |
| | | | 707/626 |
| 2012/0036264 A1* | 2/2012 | Jiang | G06F 17/30902 |
| | | | 709/226 |
| 2012/0084644 A1* | 4/2012 | Robert | G06F 17/30126 |
| | | | 715/255 |
| 2013/0103688 A1* | 4/2013 | Tien | G06Q 10/105 |
| | | | 707/737 |
| 2013/0212215 A1* | 8/2013 | Ukkola | H04L 67/02 |
| | | | 709/217 |
| 2013/0346849 A1* | 12/2013 | Krueger | G06F 17/3089 |
| | | | 715/234 |
| 2014/0068737 A1* | 3/2014 | Micucci | H04L 63/029 |
| | | | 726/7 |
| 2015/0019559 A1* | 1/2015 | Maquaire | G06F 17/30997 |
| | | | 707/740 |
| 2015/0234795 A1* | 8/2015 | Villaron | G06F 17/2235 |
| | | | 715/202 |

FOREIGN PATENT DOCUMENTS

| | | |
|---|---|---|
| CN | 101311927 A | 11/2008 |
| JP | 2006072551 A | 3/2006 |
| KR | 20080083300 A | 9/2008 |
| KR | 20090113310 A | 10/2009 |
| WO | WO 9742576 A1 * | 11/1997 ....... G06F 17/30855 |
| WO | 2001039086 A2 | 5/2001 |

OTHER PUBLICATIONS

"International Preliminary Report on Patentability Issued in PCT Application No. PCT/US2015/016058", dated Apr. 25, 2016, 6 Pages.

"International Search Report and Written Opinion Issued in PCT Patent Application No. PCT/US2015/016058", dated Apr. 23, 2015, 8 Pages.

"OLSA Integration", Published on: Apr. 20, 2012, Available at: http://www.sabahelp.com/help/se5510section508enus/learning/OLSA-integration.html.

"Linking—Cascade Knowledge Base by Hannon Hill", Published on: Aug. 18, 2009, Available at: http://www.hannonhill.com/kb/Linking/.

"Assets-YDN", Published on: Jun. 9, 2012, Available at: http://developer.yahoo.com/cocktails/mojito/docs/topics/mojito_assets.html.

"Autonomy's Broadcast Monitoring Solution", Published on: Jan. 18, 2013, Available at: http://www.autonomy.com/content/Solutions/video-broadcast-monitoring/index.en.html.

"Digital Asset Workflow", Retrieved on: Jun. 19, 2013, Available at: http://www.broadcastpapers.com/whitepapers/DigitalAssetWorkflow-WhitePaper.pdf?CFID=25809816&CFTOKEN=561c6b8063b35bc0-65171C16-CA42-4938-6738B807593895A0.

"How to Make Your Simulation SCORM Compliant", Published on: May 9, 2007, Available at: http://forio.com/broadcast/docs/advanced_features/scorm.htm.

"Office Action Issued in Chinese Patent Application No. 201580008959.2", dated Dec. 3, 2018, 10 Pages.

"Office action Issued in European Patent Application No. 15708957.4", dated May 28, 2019, 4 Pages.

"Second Office Action Issued in Chinese Patent Application No. 201580008959.2", dated Jun. 4, 2019, 5 Pages.

"Notice of Allowance Issued in Korean Patent Application No. 10-2016-7022318", dated Nov. 24, 2021, 4 Pages.

"Notice of Allowance Issued in European Patent Application No. 15708957.4", dated Jul. 25, 2022, 6 Pages.

"Office Action Issued in Korean Patent Application No. 10-2016-7022318", dated May 18, 2021, 10 Pages.

"Office Action Issued in Indian Patent Application No. 201647026414", dated Oct. 28, 2020, 7 Pages.

"Notice of Allowance Issued in European Patent Application No. 15708957.4", dated Sep. 29, 2022, 2 Pages.

"Office Action Issued in European Patent Application No. 15708957.4", dated Jan. 29, 2021, 9 Pages.

* cited by examiner

ENCODED ASSOCIATIONS WITH EXTERNAL CONTENT ITEMS

RELATED APPLICATION

This application claims the benefit of U.S. Provisional Application No. 61/940,663, filed Feb. 17, 2014.

BACKGROUND

With the advent of modern wired/wireless computing systems, the desire/need to share and access electronic content has increased. For example, users may wish to share a document with one or more other users. Some documents may be self-contained, wherein all content in the document is contained in the document. Other documents may comprise data from various external sources. For example, a slide presentation document may comprise data from a remote file source (e.g., word processing files, spreadsheet files, slide presentation files, a web page, etc., that may be stored in a web application platform library, a cloud storage service, or other remote data store). With the prevalence of new technology and wireless networking, a document, such as a presentation document, may be provided to other users by sending a link (i.e., URL) to other users to a broadcast of the document. Other users may select the URL via a browser application, wherein the users may watch a synchronized view of the presentation in the browser.

Currently, if a user wants to allow other users to have access to all collateral associated with a document, the user may have to send the document and the supplemental data or a collection of uniform resource locators (URLs) to the source files containing the raw data. If the user only sends the document, end users may not be able to tune into the "broadcast" of the document. If only a URL is sent, an end user may not be able to access the document after the broadcast of the document. Additionally, an end user may be unable to consume content that is shared with him. For example, the end user may be constrained by the type of device he is using, may be constrained by bandwidth limitations, and certain features, such as following a hyperlink in a presentation to web site, playing a video, and audio may not be enabled, etc.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an association of one or more renditions of external content items with a document. A user may create a document, for example, a slide presentation, and may select to insert a piece of external content, for example, a piece of clip art, into the document. The clip art may reside on a website. When the user selects to insert the clip art into the slide presentation document, a URL of the website where the clip art resides may be associated with the document. Other asset data may also be associated with the content item, such as public copyright license information and other relevant information, and may be encoded into the document. When the document is shared, for example, sent via email to another user, the asset data may also be provided. Accordingly, the consuming application software may be enabled to follow the URL and utilize other asset data to retrieve the content item.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

As briefly described above, embodiments of the present invention are directed to providing an encoded directory of assets associated with an external content item.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
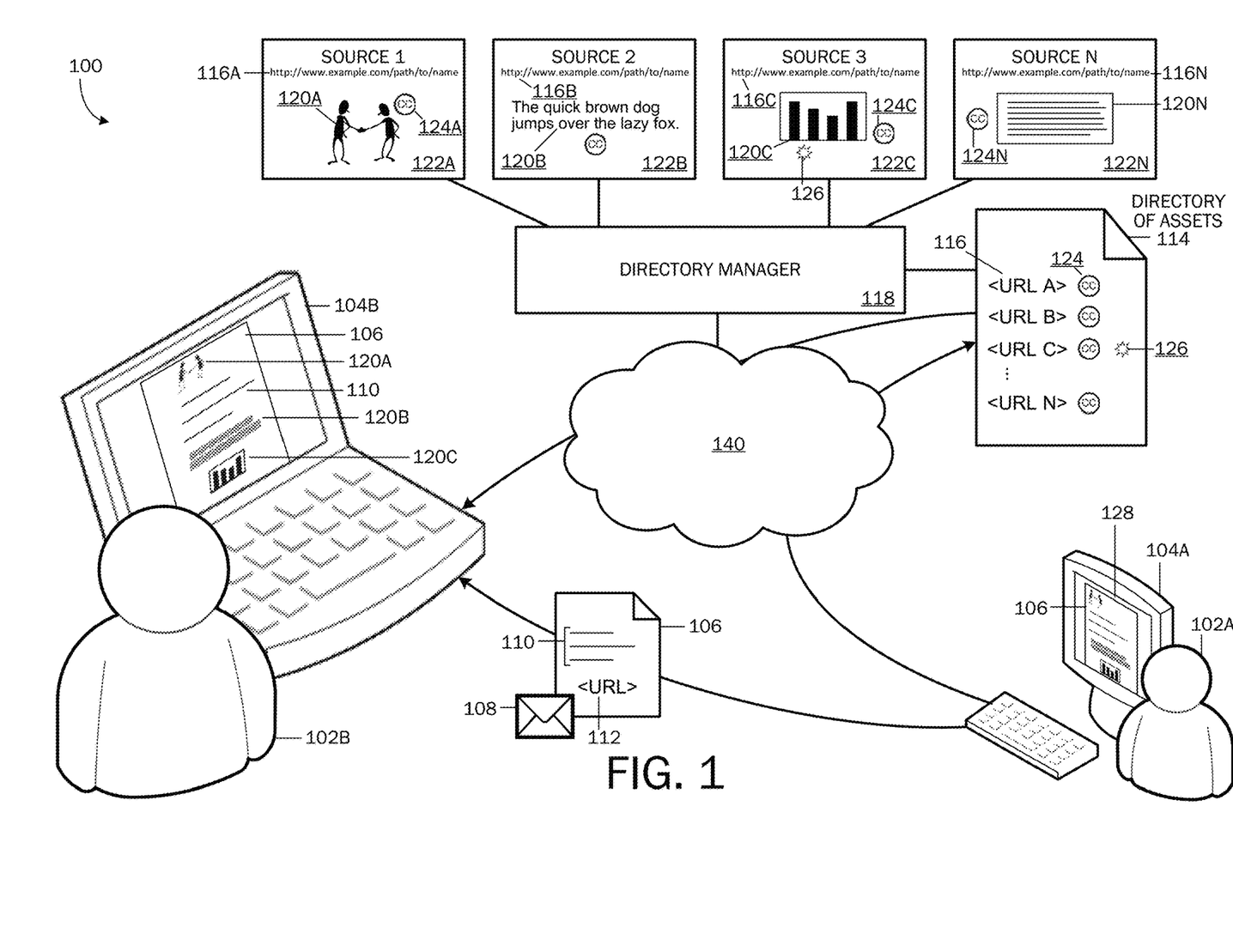
FIG. 1 is a simplified block diagram of a system for providing an encoded directory of assets associated with an external content item according to a first embodiment, the system comprising a directory manager.

Referring now to the drawings, in which like numerals represent like elements, various embodiments will be described. FIG. 1 is a block diagram illustrating a network architecture 100 for providing an encoded directory of assets associated with an external content item according to a first embodiment. The network architecture 100 includes one or more computing devices 104. Each computing device 104 may be one of various types of computing devices (e.g., a tablet computing device, a desktop computer, a mobile communication device, a laptop computer, a laptop/tablet hybrid computing device, a gaming device, a wall-type computing device, or other types of computing devices) for executing applications 128 for performing a variety of tasks.

A user 102 may utilize an application 128 on a computing device 104 for a variety of tasks, which may include, for example, to write, calculate, draw, organize, prepare presentations, send and receive electronic mail, take and organize notes, make music, and the like. Applications 128 may include thick client applications, which may be stored locally on the computing device 104, or may include thin client applications (i.e., web applications) that may reside on a remote server and accessible over a network 140, such as the Internet or an intranet. A thin client application may be hosted in a browser-controlled environment or coded in a browser-supported language and reliant on a common web browser to render the application executable on a computing device 104. The computing device 104 may be configured to receive content for presentation on a display (which may comprise a touch screen display). For example, content may include a document 106 comprising external content items 120 as will be described in further detail below.

An application 128 may be configured to enable a user 102 to use a pointing device (e.g., a mouse, pen/stylus, etc.) and/or to utilize sensors (e.g., touch sensor, accelerometer, hover, facial recognition, voice recognition, etc.) on the computing device 102 to interact with content via a number of input modes. To assist users to locate and utilize functionalities of a given application 128, a user interface (UI) containing a plurality of informative and/or selectable functionality controls may be provided.

According to embodiments, a first user 102A may utilize an application 128 running on a computing device 104A to write data into a document 106. The data may include information created by the user 102A and entered directly into the document 106 (referred to herein as local data 110). For example, the user 102A may input text or numbers, and/or create a table, a figure, or a chart using the input text or numbers, etc. The data written to the document 106 may also include content created in or included in a separate source file 122, herein referred to as an external content item 120. For example, an external content item 120 may be contained in a source file 122, which may be located on a remote server and accessed via a network 140, such as the Internet. The location of the source file 122 on the network 140 may be specified by a URL 116.

According to embodiments, when a user 102A adds one or more external content items 120 to a document 106, a directory of assets 114 associated with an external content item 120 may be encoded into the document 106. The directory of assets 114 may include such information as, but is not limited to, the location of the source file 122 where the external content item 120 is stored, which may be specified by a URL (herein referred to as a source URL 116), copyright license information (e.g., creative commons license) 124, expiration notice information 126, as well as other information that may be associated with the external content item 120.

According to the first embodiment and as illustrated in FIG. 1, the directory of assets 114 may be managed by a directory manager 118 on a remote server, and a URL 112 of the directory of assets 114 may be encoded into the document 106. The URL 112 associated with the directory of assets 114 may be encoded in a predefined location for storing data in the underlying file format of the document, for example, in an open XML format extension list.

According to embodiments, a user 102A may wish to share the document 106 with one or more other users 102. A document 106 may be shared with other users 102 via various methods. For example and as illustrated in FIG. 1, the user 102A is sharing the document 106 with another user 102B herein referred to as an endpoint user 102B via attachment of the document 106 to an email 108. According to an embodiment, the document 106 may be a slide presentation document and may be shared with one or more other users for a slide presentation broadcast. As should be understood, this is for purposes of example, and embodiments are not limited to such.

According to the first embodiment, an application 128 on an endpoint user's 102B computing device 104B may be able to follow the URL 112 to the directory of assets 114, wherein the directory manager 118 may follow the source URLs 116 to retrieve the external content items 120 for display in the document 106. Other asset data (e.g., copyright license data 124, expiration notice information 126, etc.) associated with external content items 120 and included in the directory of assets 114 may also be read and processed accordingly.

The directory manager 118 may be operable to check source files 122 for updates to external content items 120. The frequency of checking for updates may vary based on various factors such as the type of information represented by a content item, available bandwidth, etc. For example, if an external content item 120 is the world population, the directory manager 118 may check for updates to the content item less frequent than, for example, flight status information. The directory manager 118 may also be operable to enact policies, such as access allowances such that only trusted clients may access a certain source file 116 and/or external content item 116.

Figure 2:
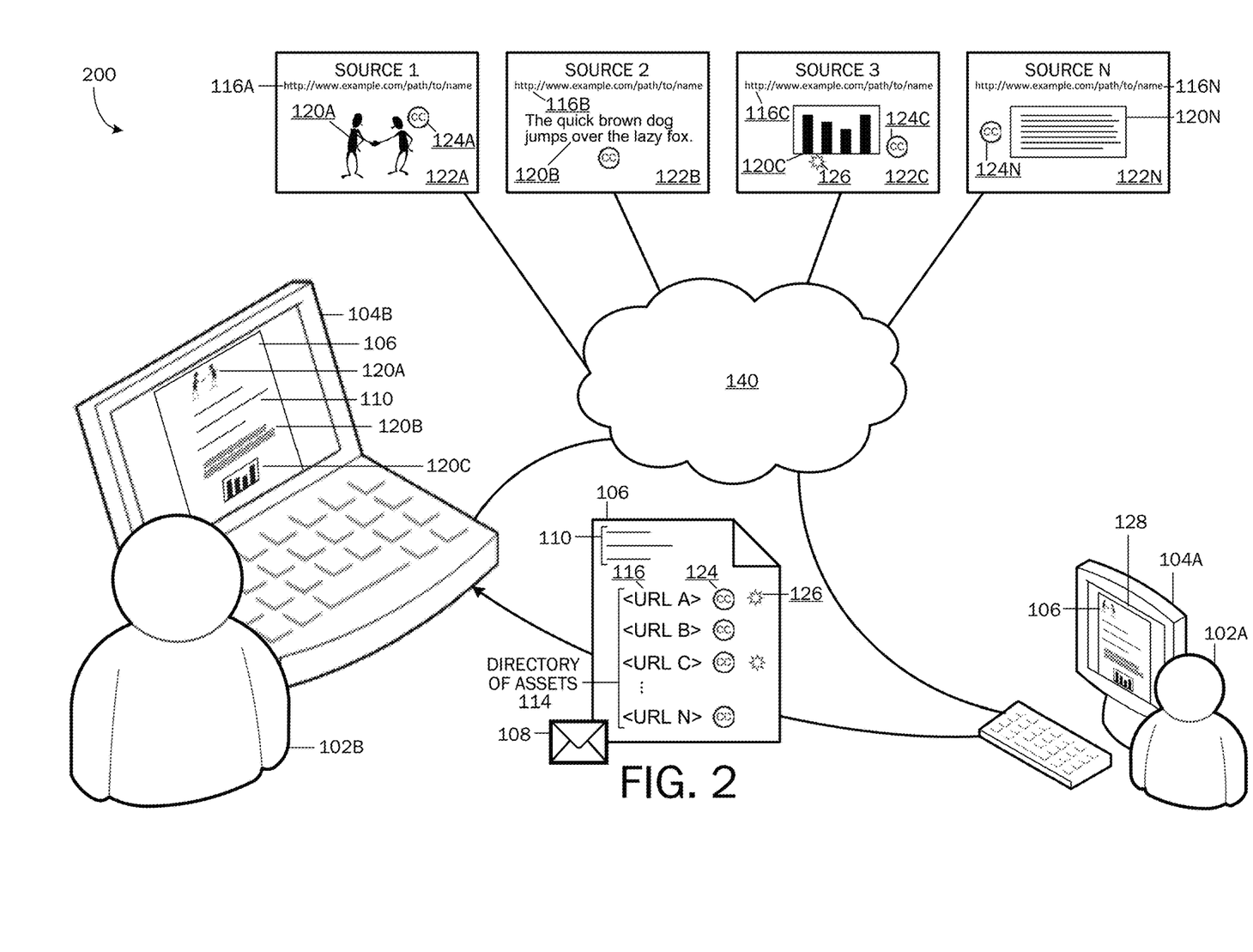
FIG. 2 is a simplified block diagram of a system for providing an encoded directory of assets associated with an external content item according to a second embodiment.

Referring now to FIG. 2, a block diagram of a network architecture 200 for providing an encoded directory of assets associated with an external content item according to a second embodiment is illustrated. According to the second embodiment and as illustrated in FIG. 2, the directory of assets 114 may be encoded into the document 106. For example, the system 200 of the second embodiment may not include a directory manager 118.

According to the second embodiment, an application 128 on an endpoint user's 102B computing device 104B may be able to follow the source URLs 116 to retrieve the external content items 120 for display in the document 106, and to process any additional asset data (e.g., copyright license data 124, expiration notice information 126, etc.) associated with external content items 120 and included in the directory of assets 114.

According to the example document 106 illustrated in FIGS. 1 and 2, multiple external content items 120A, 1206, 120C, 120N are included in the document 106. The multiple external content items 120A, 1206, 120C, 120N may reside in a plurality of source files 122. For example, a first external content item 120A, which is illustrated as a piece of clip art, may be located in a first source file 122A, such as a webpage. A second external content item 120B, which is illustrated as text, may be located in a second source file 122B, such as a document in a web application platform library. A third external content item 120C, which is illustrated as a graph, may be located in a third source file 122C, such as in a document in a cloud storage service. The document 106 may include additional external content items 120N located in other source files 122N. As mentioned above, the location of each of the external content items 120 may be specified by a URL 116. A content item 120 may comprise additional asset data, such as a public copyright license 124 (e.g., a creative commons license (CCL)), expiration notice information 126 (e.g., information specifying that an external content item 120 may no longer be relevant), etc.

Figure 3:
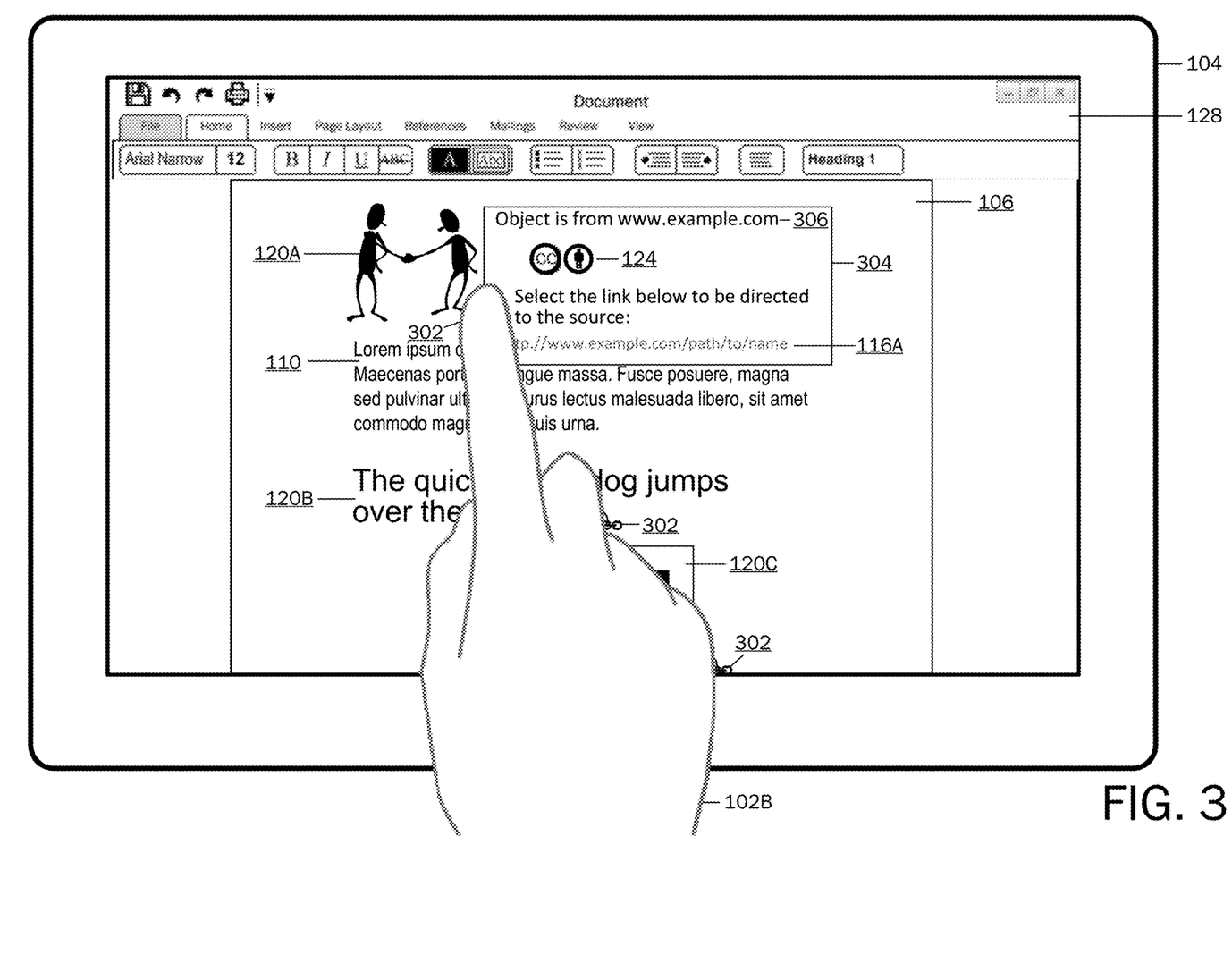
FIG. 3 is an illustration of a document comprising external content items and a dialog box displayed upon selection of an external content item indicator.

Referring now to FIG. 3, the example document 106 of FIGS. 1 and 2 is shown displayed on a tablet computing device 104 of an end user 102B. For example, when the document 106 is shared with the end user 102B, he may selectively open the document, wherein the document 106 may be opened in an application 128 UI. The displayed document 106 may include information created by the user 102A and entered directly into the document 106 (i.e., local data 110). The application 128 may follow the URLs 116 encoded in the directory of assets 114 to access the external content items 120A, 1206, and 120C for display on the computing device 104.

As illustrated in FIG. 3, a visual indicator 302 may be displayed with an external content item 120, indicating that the external content item 120 is provided by an external source 122. The visual indicator 302 may be a selectable icon as illustrated, may be a visual attribute applied to the external content item 120 (e.g., highlighted, animated, underlined, boxed, etc.). Upon selection of the external content item 120 or the visual indicator 302, a dialog box 304 may be displayed, which may comprise asset information associated with the external content item 120. For example and as illustrated, the dialog box 304 may include information about where the object is derived 306, may include license information 124, and my include a selectable URL 116, which when selected, may direct the end user 102B to the source file 122.

Figure 4:
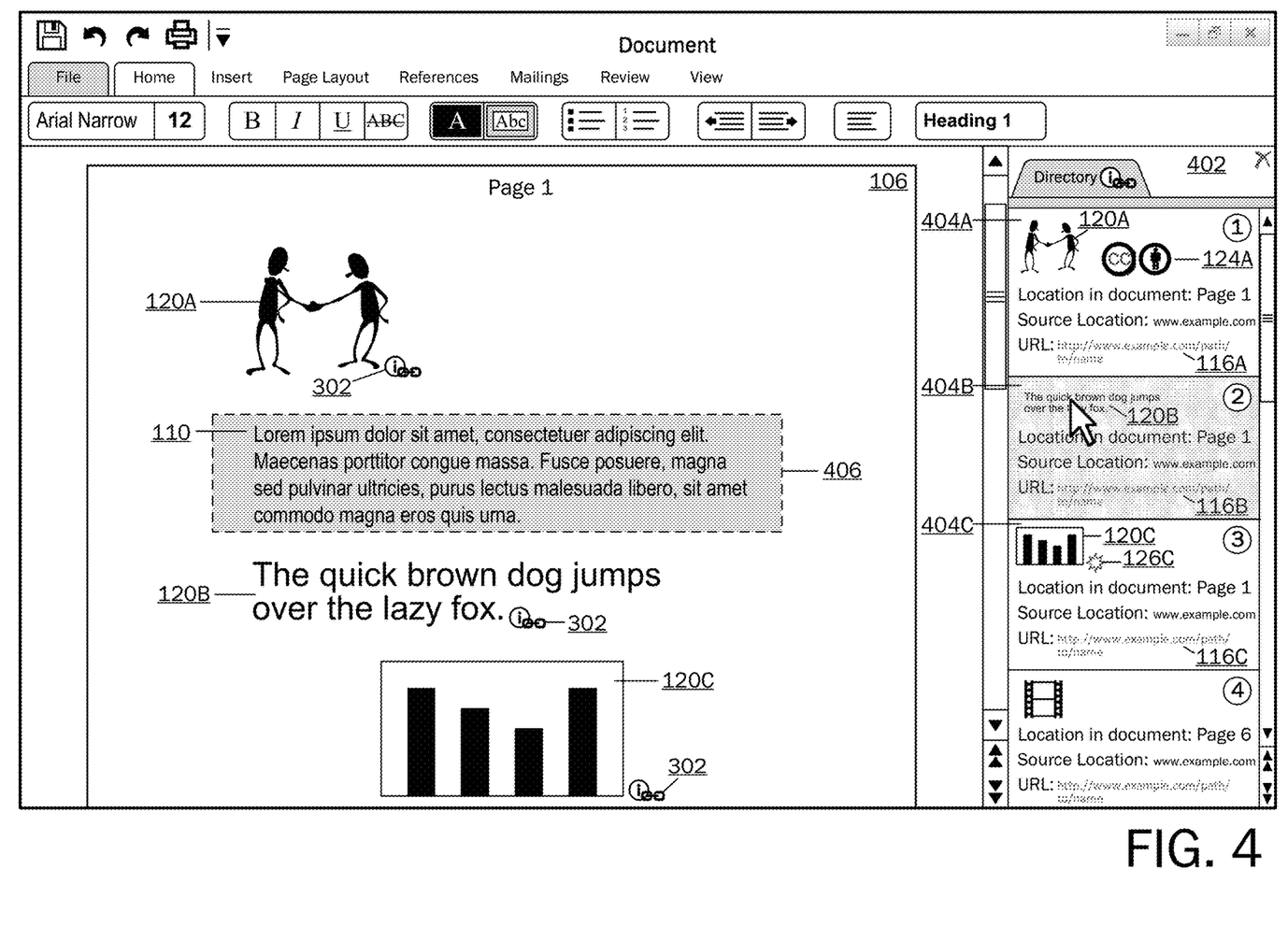
FIG. 4 is an illustration of a directory of assets task pane displayed in an application user interface.

According to embodiments and as illustrated in FIG. 4, a directory of assets 114 task pane 402 may be provided, which may include a listing of assets 404. Each asset listing 404A, 404B, 404C may include an external content item 120 and asset information (e.g., URLs 116, license information 124, expiration notice information 126, etc.) associated with each external content item 120. According to an embodiment, a user 102 may be able to select an asset listing 404, which may provide navigation to the source file 122. For example, a user 102 may select asset listing 404B, and the source file 122 may be displayed to the user in a UI frame. According to another embodiment and as illustrated in FIG. 4, selection of an asset listing 404 may provide navigation to the content item 120 in the document 106. When a asset listing 404 in the directory of assets 114 task pane 402 is selected, an indication of selection 406 may be displayed on the corresponding content item 120 in the document 106.

Figure 5:
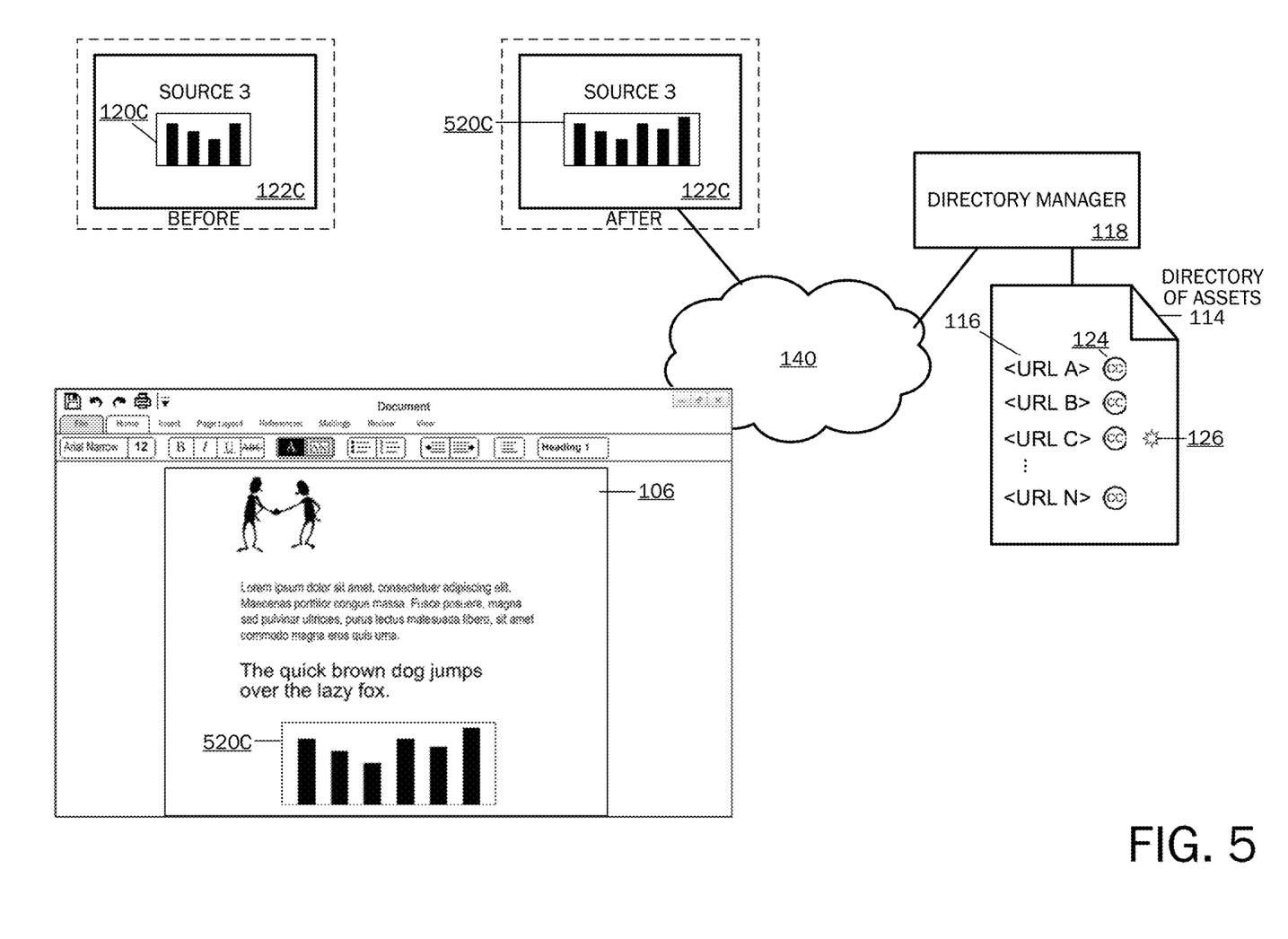
FIG. 5 is an illustration of a document comprising an updated external content item.

FIG. 5 shows a document 106 comprising an external content item 120 that has been updated at its source 122. As described above, the directory manager 118 may be operable to automatically check for updates of external content items 120. When an external content item 120 has been updated at its source 122, the directory manager 118 may either automatically replace the original external content item 120 with the updated content 520, or may provide an indication of expiration 126 of the original content 120, wherein the user 102A may choose to replace the content or the end user 102B may choose to navigate to the source file 122 to view the updated content 520. The example document 106 in FIG. 5 is shown with the updated content 520.

Figure 6:
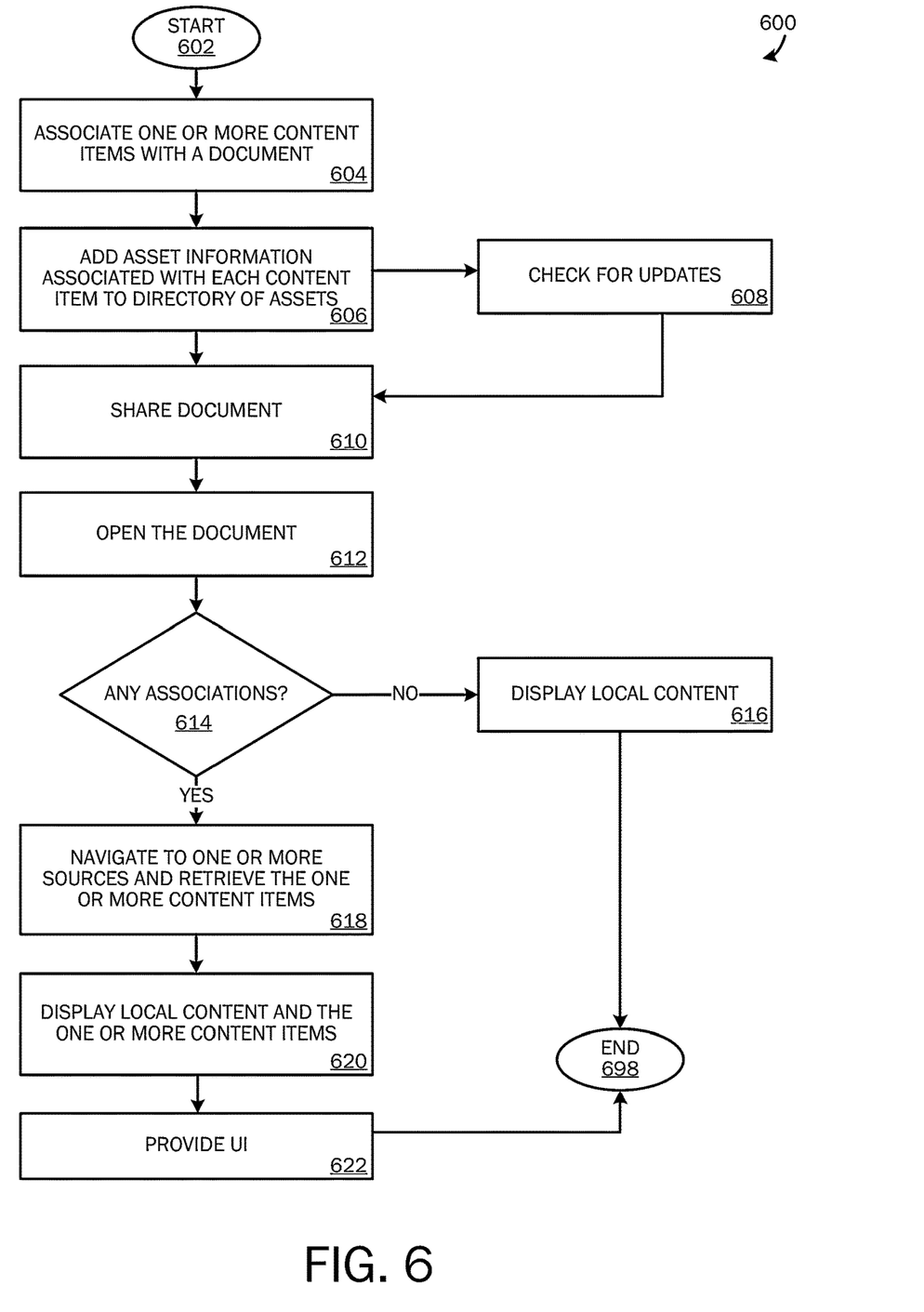
FIG. 6 a flow chart of a method for providing an encoded directory of assets associated with an external content item.

FIG. 6 is a flow chart showing one embodiment of a method 600 for providing an encoded directory of assets 114 associated with an external content item 120. The method 600 starts at OPERATION 602 and proceeds to OPERATION 604 where one or more external content items 120 may be associated with a document 106. For example, a user 102A may create a document 106 and may select content from an external source file 122 to copy into the document 106. At OPERATION 606, asset information associated with each external content item 120 may be included in a directory of assets 114 and encoded into the document 106. The asset information may include URLs 116, license information 124, expiration notice information 126, and other information associated with the external content item 120. As described above, source URLs 116 to each external content item 120 may be written into the document 106, or alternatively, a single URL 112 may be written into the document 106, wherein the single URL may be a location of the directory of assets 114 maintained by a directory manager 118. If the directory of assets 114 is maintained by a directory manager 118, at OPERATION 608, the directory manager 118 may automatically check the one or more source files 122 for updates to the external content items 120.

The method 600 may proceed to OPERATION 610, where the document 106 may be shared with one or more other users 102. For example, the user 102A may send the document 106 to an end user 102B in an email 108. At OPERATION 612, the end user 102B may open the document 106. For example, the end user 102B may open the document 106 from the email 108, or may save the document 106 to his local computing device 104B and select to open the document 106. Accordingly, the document 106 may be displayed in an application 128 UI.

At DECISION OPERATION 614, the application 128 may check the document code for any asset association information encoded into the document 106, for example, a URL 112 to a directory of assets 114 or source URLs 116. If a determination is made that the document 106 does not comprise any asset association information, at OPERATION 616, the application 128 may display the local content 110, for example, the content created by the user 102A. Alternatively, if a determination is made that the document 106 does comprise asset association information, at OPERATION 618, the application 128 may navigate to the directory of assets 114 or to the one or more source files 116 to pull in the one or more external content items 120 into the document 106. The application 128 may be able to open a shared document 106, transparently grab external content items 120, and at OPERATION 620, may display the document 106 and external content items 120 in a format suitable for the consuming computing device 104B.

At OPERATION 622, various UI functionalities may be provided, for example, a visual indicator 302 may be displayed with an external content item 120 for displaying an indication of an external content item 120; a dialog box 304 may be provided for displaying associated asset information; a directory of assets 114 task pane 402 may be provided, which may include a listing of assets 404, wherein each asset listing 404A, 404B, 404C may include an external content item 120 and asset information (e.g., URLs 116, license information 124, expiration notice information 126, etc.) associated with each external content item 120; URLs 116 may be provided for allowing a user 102 to selectively navigate to a file source 122; etc. The method 600 may end at OPERATION 698.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
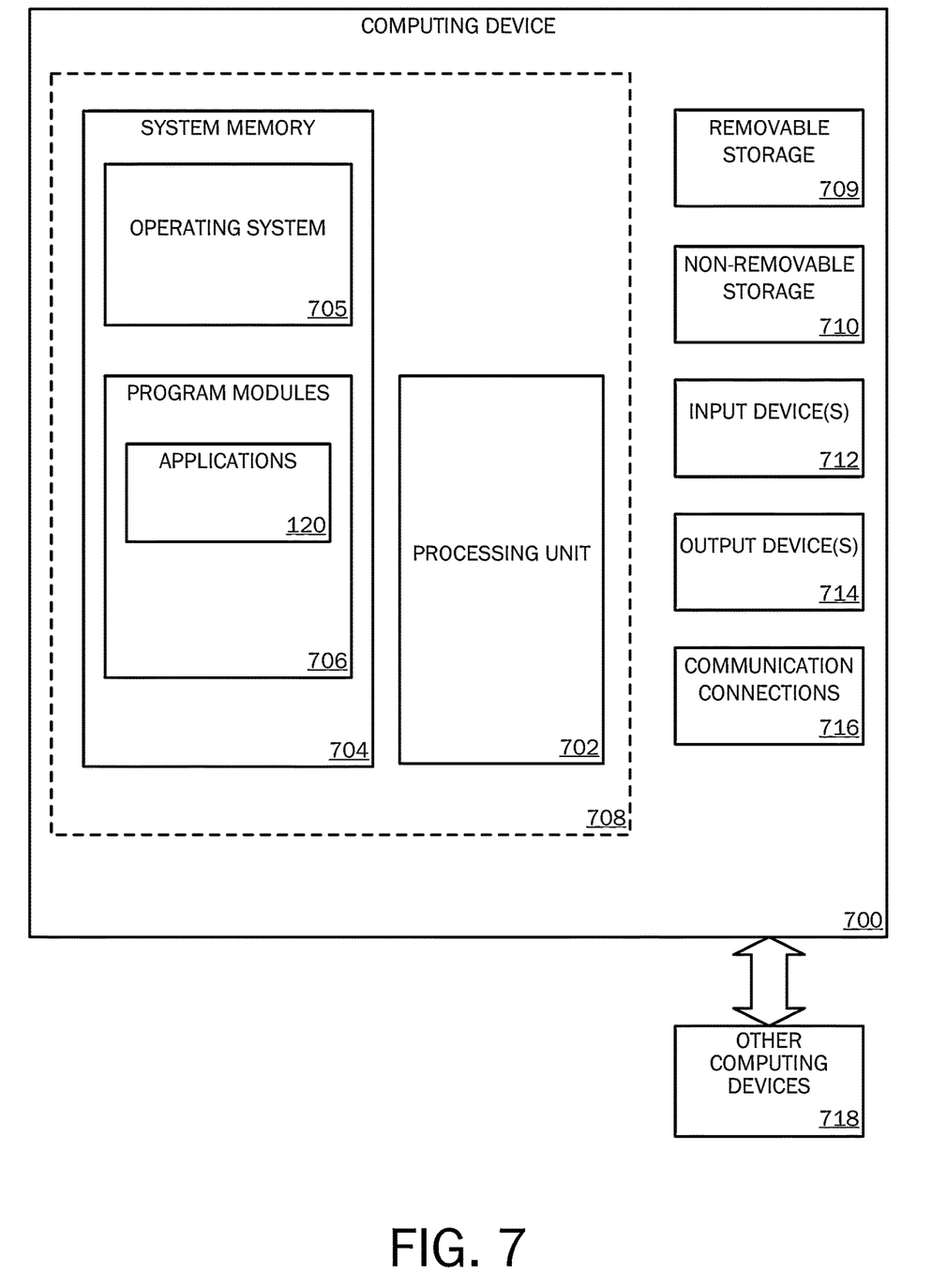
FIG. 7 is a block diagram illustrating example physical components of a computing device with which embodiments of the invention may be practiced.
Figure 8A:
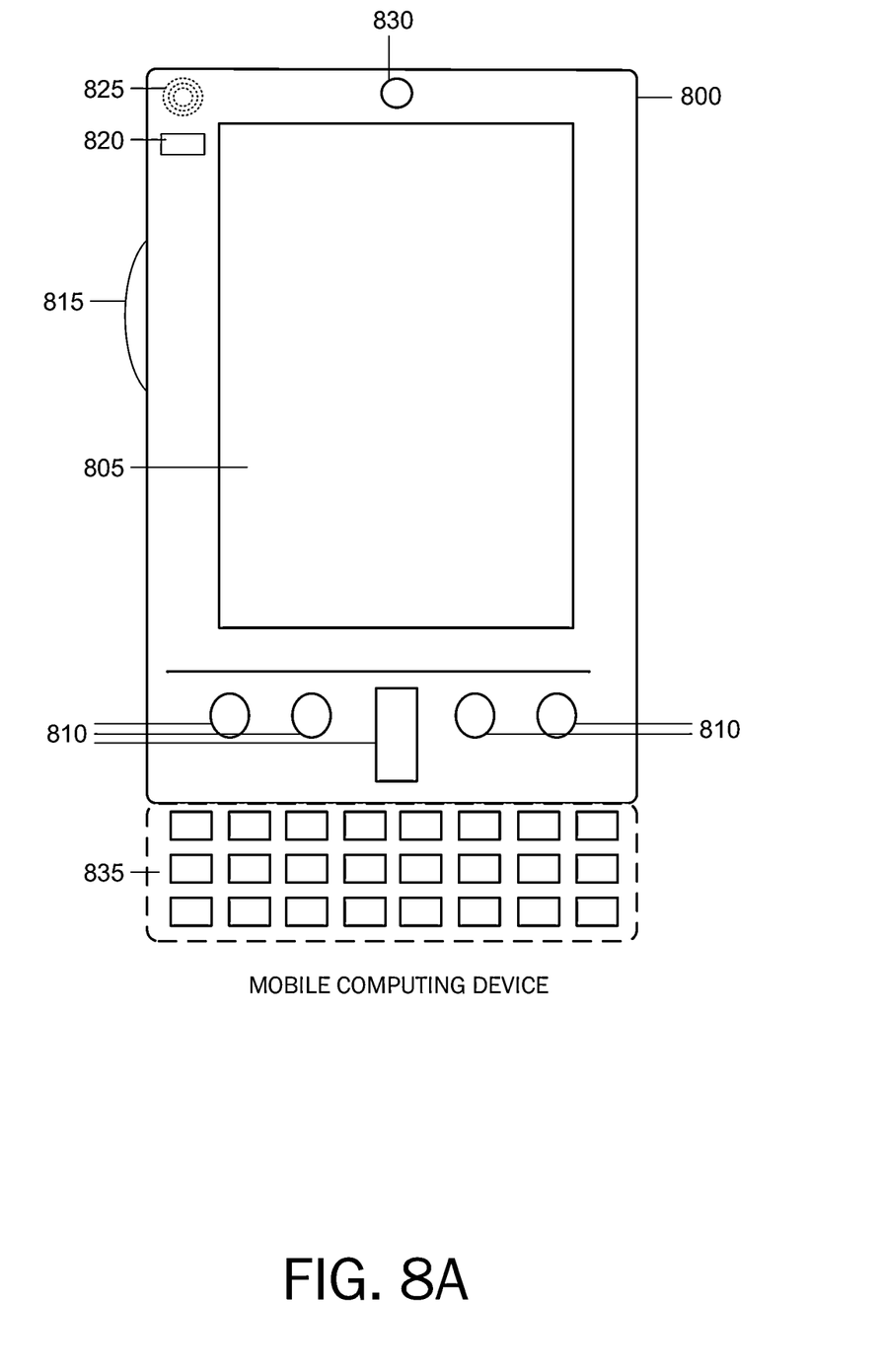
FIGS. 8A and 8B are simplified block diagrams of a mobile computing device with which embodiments of the present invention may be practiced.
Figure 8B:
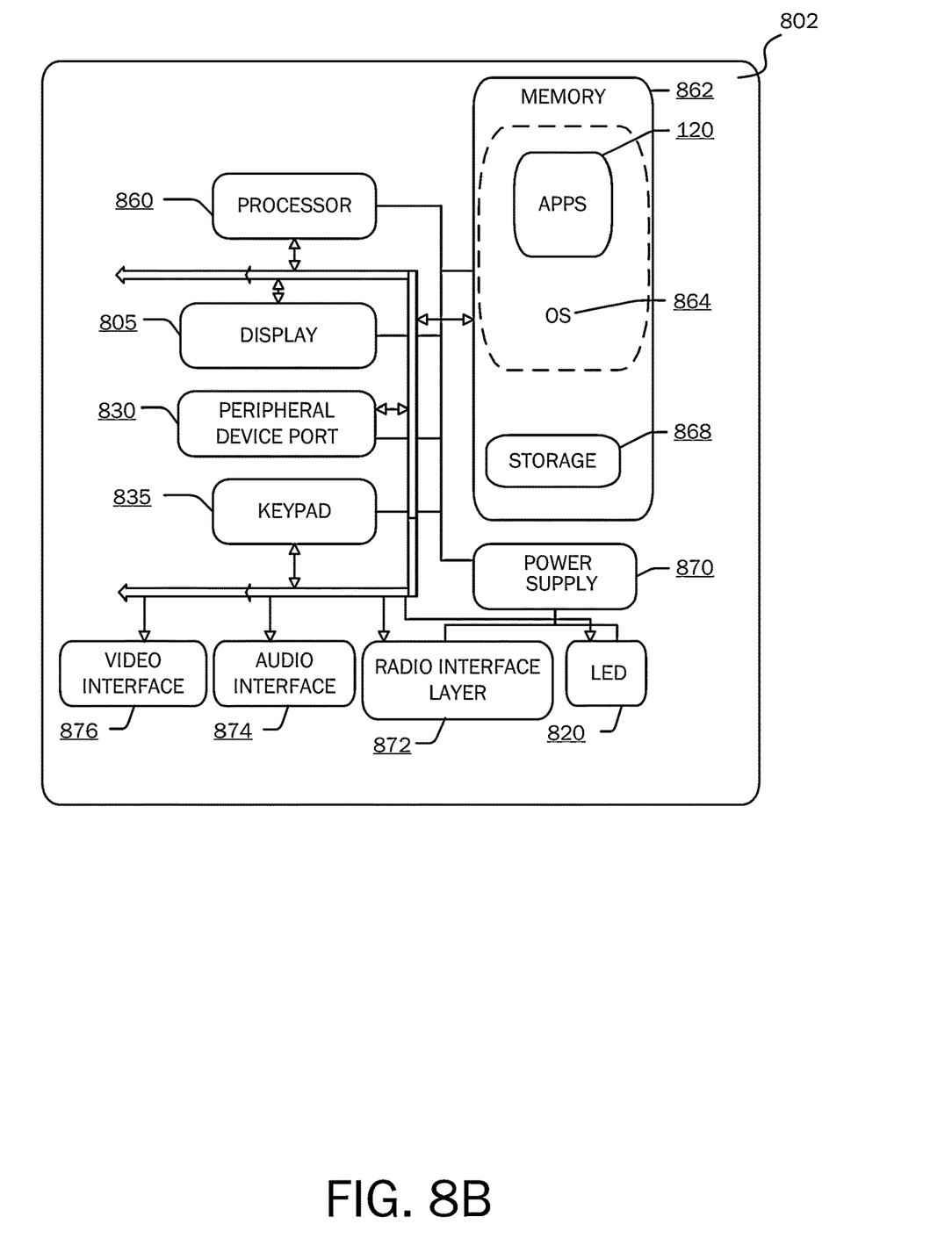
Figure 9:
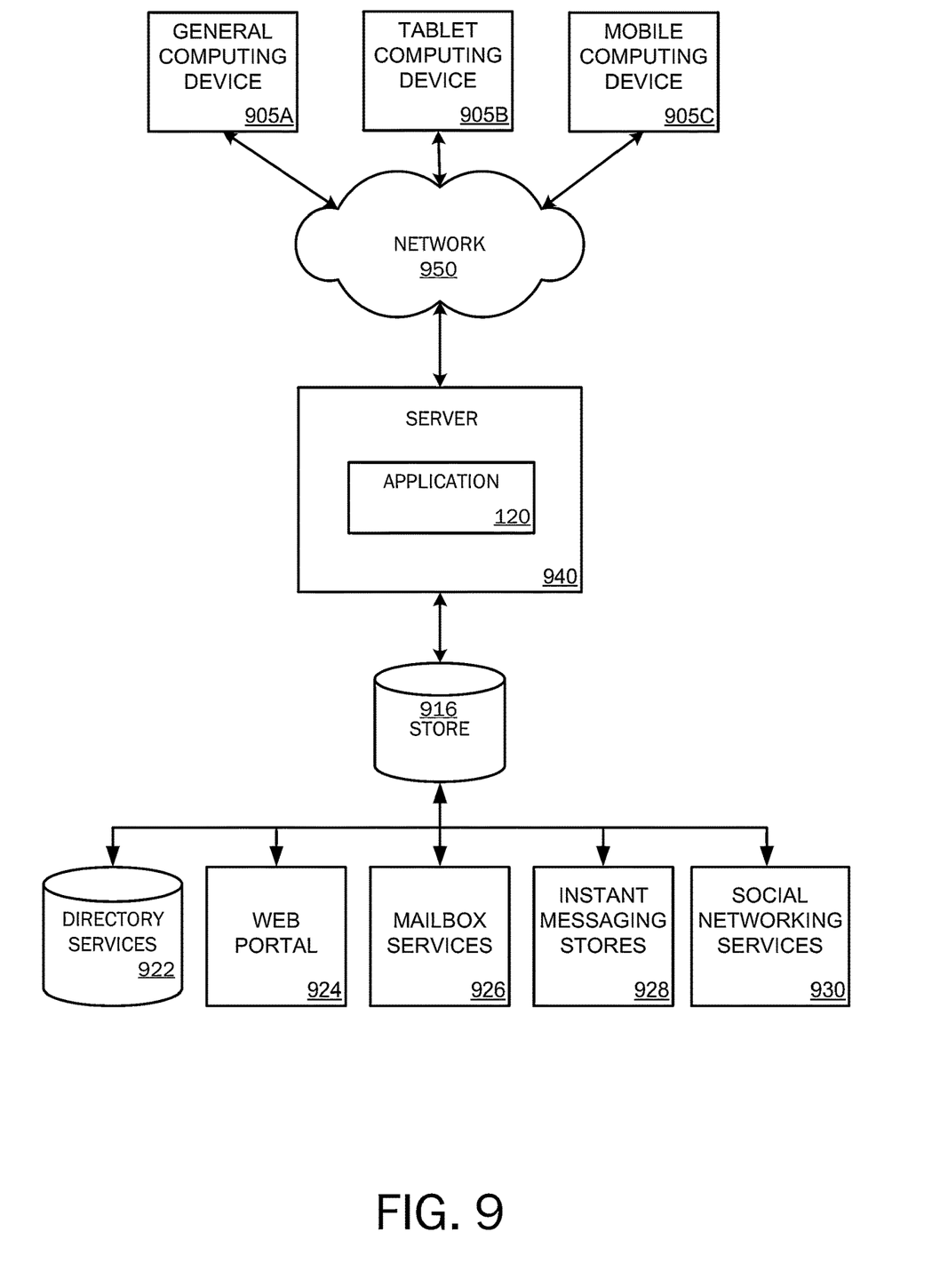
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 128. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the method 600 illustrated in FIG. 6. Other program modules that may be used in accordance with embodiments of the present invention may include applications 128, such as, electronic mail and contacts applications, word processing applications, spreadsheet applications, database applications, slide presentation applications, notes applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. Computer storage media does not include a carrier wave or other propagated or modulated data signal. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 128 may be loaded into the memory 862 and run on or in association with the operating system 864. Examples of the application programs include phone dialer programs, e-mail programs, personal information management (PIM) programs, notes applications, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 120 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 128 via the operating system 864, and vice versa.

The visual indicator 820 may be used to provide visual notifications and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing encoded associations with external content items 120, as described above. Content developed, interacted with, or edited in association with an application 128 may be stored in different communication channels or other storage types. For example, various documents may be stored using a directory service 922, a web portal 924, a mailbox service 926, an instant messaging store 928, or a social networking site 930. The application 128 may use any of these types of systems or the like for enabling data utilization, as described herein. A server 940 may provide the application 128 to clients. As one example, the server 940 may be a web server providing the application 128 over the web. The server 940 may provide the application 128 over the web to clients through a network 140. By way of example, the client computing device 104 may be implemented and embodied in a personal computer 905A, a tablet computing device 905B and/or a mobile computing device 905C (e.g., a smart phone). Any of these embodiments of the client computing device 905A, 905B, 905C may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

I claim:

1. A method for associating external content with a document, the method comprising:
    receiving a user selection to insert an external content item in a document, wherein the external content item is stored at a separate source file;
    upon receiving the user selection, encoding a directory of assets associated with the external content item in the document by adding a first link to the directory of assets in the document, wherein the directory of assets is a directory that includes information about the external content item associated with the document; and
    adding asset information associated with the external content item to the directory of assets, wherein the asset information includes a second link to the source file at which the external content item is stored;
    wherein upon receiving a request for opening the document, a document code for the document is checked for any asset information encoded in the document, and upon determining that the document includes the first link to the directory of asset, an application associated with the document automatically navigates via the first link to the directory of assets, navigates via the second link in the directory of assets to the external content item at the source file and automatically inserts the external content item stored at the separate source file for display in the document.

2. The method of claim 1, wherein adding the asset information associated with the external content item comprises writing a uniform resource locator specifying the location of the external content item at the source file into the directory of assets.

3. The method of claim 2, further comprising:
    writing copyright license information associated with the external content item into the directory of assets;
    causing display of a selectable indicator with the external content item; and
    in response to a selection of the selectable indicator, causing display of the copyright license information.

4. The method of claim 2, further comprising:
    writing expiration notice information associated with the external content item into the directory of assets;
    causing display of a selectable indicator with the external content item; and
    in response to a selection of the selectable indicator, causing display of the expiration notice information.

5. The method of claim 1, wherein adding the first link to the directory of assets into the document comprises encoding a uniform resource locator specifying a location of the directory of assets into the document.

6. The method of claim 1, further comprising causing the directory of assets to be displayed in a user interface.

7. The method of claim 1, further comprising:
    causing a selectable visual indicator to be displayed with the external content item;
    receiving a selection of the selectable visual indicator; and
    in response to the selection of the selectable visual indicator, causing the asset information associated with the external content item to be displayed.

8. The method of claim 1, further comprising:
    determining if the external content item has been updated in the source file; and
    based on a determination that the external content item has been updated, automatically retrieving the updated external content item for display in the document.

9. A system for associating external content with a document, the system comprising:
    one or more processors; and
    a memory coupled to the one or more processors and storing instructions, that when executed by the one or more processors, cause the one or more processors to perform a method comprising:
        receiving a user selection to insert an external content item in a document, wherein the external content item is located in an external source file;
        upon receiving the user selection, encoding a directory of assets associated with the external content item in the document by adding a first link to the directory of assets in the document, wherein the directory of assets is a directory that includes information about the external content item associated with the document;

adding asset information associated with the external content item the directory of assets, wherein the asset information comprises a second link to the external source file at which the external content item is stored;

wherein upon receiving a request for opening the document, a document code for the document is checked for any asset information encoded in the document, and upon determining that the document includes the first link to the directory of asset, an application associated with the document automatically navigates via the first link to the directory of assets, navigates via the second link in the directory of assets to the external content item at the external source file and automatically retrieves the external content item for display in the document and automatically retrieves the directory of assets for display with the document, the directory of assets comprising an asset listing associated with the external content item that includes the external content item and the asset information associated with the external content item.

10. The system of claim 9, wherein the second link comprises a uniform resource locator specifying the location of the external content item at the external source file.

11. The system of claim 9, wherein the asset information in the directory of assets further comprises one or more of:
copyright license information associated with the external content item; or
expiration notice information associated with the external content item.

12. The system of claim 9, wherein adding the first link into the document comprises encoding a uniform resource locator specifying a location of the directory of assets into the document.

13. The system of claim 12, wherein the memory stores further instructions for causing the directory of assets to be displayed in a user interface.

14. The system of claim 9, wherein the memory stores further instructions for:
causing a selectable visual indicator to be displayed with the external content item;
receiving a selection of the selectable visual indicator; and
in response to the selection of the selectable visual indicator, causing the asset information associated with the external content item to be displayed.

15. A method, comprising:
opening a document that includes a first link to a directory of assets associated with the document;
navigating, via the first link, to the directory of assets, the directory of assets comprising asset information that includes a plurality of second links to locations of external content items that are currently included in the document for display in the document;
navigating, via the plurality of second links, to the locations of the external content items;
receiving the external content items;
receiving the directory of assets, the directory of assets comprising an asset listing for each external content item that comprises the external content item and the asset information associated with the external content item;
causing display of the document and the external content items in the document; and
causing display of the directory of assets,
wherein the first link to the directory of assets associated with the document is added to the document, upon receiving a user selection to insert an external content item stored at a separate location into the document.

16. The method of claim 15, further comprising in response to a selection of a particular external content item, causing the asset information associated with the particular external content item to be displayed in a dialog box.

17. The method of claim 15, further comprising:
causing a selectable visual indicator to be displayed with an external content item;
in response to a selection of the selectable visual indicator, causing the asset information associated with the external content item to be displayed.

18. The method of claim 15, wherein:
causing display of the document and the external content items in the document comprises causing display of the document and the external content items in the document in a user interface; and
causing display of the directory of assets comprises causing display of the directory of assets in a task pane of the user interface adjacent the document.

19. The method of claim 15, wherein the asset information associated with at least one external content item further comprises one or more of:
an identification of the location of the external content item; or
the second link to the location of the external content item.

20. The method of claim 15, wherein the asset information associated with at least one external content item further comprises one or more of:
copyright license information associated with the external content item; or
expiration notice information associated with the external content item.

21. The method of claim 15, wherein at least one of the external content item comprises an image.

* * * * *